US009647571B2

(12) United States Patent
Orr et al.

(10) Patent No.: US 9,647,571 B2
(45) Date of Patent: May 9, 2017

(54) INTERNAL INVERTER COMMUNICATIONS (71) Applicant: Solantro Semiconductor Corp., Ottawa (CA)

(72) Inventors: Raymond Kenneth Orr, Kanata (CA); Tudor Lipan, Ottawa (CA); Alexandru Dorin Nicolescu, Ottawa (CA)

(73) Assignee: Solantro Semiconductor Corp. (CA)

( * ) Notice: Subject to any disclaimer, the term of this patent is extended or adjusted under 35 U.S.C. 154(b) by 730 days.

(21) Appl. No.: 13/958,149

(22) Filed: Aug. 2, 2013

(65) Prior Publication Data

US 2015/0036395 A1 Feb. 5, 2015

(51) Int. Cl.
*H02M 3/335* (2006.01)
*H02M 7/48* (2007.01)
*H02J 3/38* (2006.01)
*H02M 1/00* (2006.01)

(52) U.S. Cl.
CPC ..... *H02M 7/4807* (2013.01); *H02M 3/33523* (2013.01); *H02J 3/383* (2013.01); *H02M 2001/007* (2013.01); *Y02E 10/563* (2013.01)

(58) Field of Classification Search
CPC ........... H02M 3/33523; H02M 7/4807; H02M 2001/007; H02M 3/335; H02J 3/383; H02J 3/385

See application file for complete search history.

(56) References Cited

U.S. PATENT DOCUMENTS

| | | | | |
|---|---|---|---|---|
| 8,693,228 B2* | 4/2014 | Matan | ................. | H02J 3/18 323/207 |
| 2010/0157638 A1* | 6/2010 | Naiknaware | ........ | H02M 7/4807 363/131 |
| 2010/0302819 A1* | 12/2010 | O'Brien | ................. | G05F 1/67 363/95 |
| 2012/0008348 A1 | 1/2012 | Chapman | | |
| 2012/0063177 A1* | 3/2012 | Garrity | ................. | H02J 3/383 363/37 |
| 2012/0099345 A1* | 4/2012 | Zhao | ................. | H02M 1/36 363/21.05 |
| 2012/0127764 A1* | 5/2012 | Phadke | ................. | H02J 3/383 363/37 |
| 2012/0320641 A1* | 12/2012 | Chapman | ................. | H02J 3/383 363/37 |

(Continued)

*Primary Examiner* — Jessica Han
(74) *Attorney, Agent, or Firm* — Barnes & Thornburg LLP (57) ABSTRACT

Inverter internal communication features are disclosed. A multiple-stage inverter includes DC to DC and DC to AC converter switches in different power domains, which share no common return path connection. Operating parameters for converter switches in both power domains are determined by a single controller, located in one of the power domains. Converter control signals are communicated from the controller across an interface between the power domains. Respective, separate controllers in each power domain are not required. Components on each side of the interface could be integrated into respective integrated circuits. A planar transformer implemented in wiring levels of a Printed Circuit Board (PCB) that carries components of the inverter could be provided to enable communications between the power domains while reducing component count and physical space requirements.

20 Claims, 10 Drawing Sheets (56) References Cited

U.S. PATENT DOCUMENTS

2013/0077372 A1\* 3/2013 Wagoner ............... H02J 3/383
                                                        363/131
2013/0155732 A1\* 6/2013 Wagoner ............ H02M 7/4807
                                                        363/40

\* cited by examiner

INTERNAL INVERTER COMMUNICATIONS

FIELD OF THE INVENTION

This invention relates generally to Direct Current (DC) to Alternating Current (AC) inverters and, in particular, to their internal communications and control.

BACKGROUND

Inverters convert DC power into AC power. A common inverter application is to convert power from a variable DC source into constant voltage AC power to supply an electrical grid. Many DC power sources, such as a solar photovoltaic panel or a windmill, for example, have a variable power output. In many inverter designs portions of the inverter are located in separate power domains and are physically isolated from each other without connected return paths. This situation represents a challenge in terms of inverter control for proper functioning. In some implementations, separate controllers are provided, including one controller for each power domain.

SUMMARY

A two-stage DC to AC inverter includes: a first stage that has a DC to DC converter with an input portion in a first power domain and an output portion in a second power domain. The first power domain and the second power domain share no common return path connection. The inverter also includes a second stage with a DC to AC converter in the second power domain and operatively coupled to the output portion of the DC to DC converter; and a single controller, located in one of the first power domain and the second power domain, and operatively coupled to the DC to DC converter and to the DC to AC converter, to determine operating parameters for the DC to DC converter and the DC to AC converter.

The single controller is located in the second power domain in an embodiment.

The inverter could also include a transformer with a first winding in the first power domain and a second winding in the second power domain. One of the first winding and the second winding could then be coupled to the controller to enable communications between the controller and a component in the other of the first power domain and the second power domain that is coupled to the other of the first winding and the second winding.

The transformer could be a planar transformer implemented in wiring levels of a Printed Circuit Board (PCB) that carries components of one or more of the DC to DC converter, the DC to AC converter, and the controller.

Communication circuitry could be provided, in the one of the first power domain and the second power domain, to enable the controller to communicate with a component in the other of the first power domain and the second power domain. The communication circuitry could be integrated with the controller as a single integrated circuit.

Communication circuitry could also or instead be provided, in the other of the first power domain and the second power domain, to enable a component in the other of the first power domain and the second power domain to communicate with the controller. The inverter could also include switch waveform generation circuitry, in the other of the first power domain and the second power domain and operatively coupled to the communication circuitry, to generate switch waveforms to open and close one or more switches in the input portion of the DC to DC converter based on the operating parameters determined for the DC to DC converter by the controller. The communication circuitry could be integrated with switch waveform generation circuitry as a single integrated circuit.

In an embodiment, the inverter includes respective switch waveform generation circuitry in the first power domain and the second power domain, to receive converter control signals from the controller and to generate respective switch waveforms to open and close the one or more switches in the input portion of the DC to DC converter and the one or more switches in the DC to AC converter based on the converter control signals.

The switch waveform generation circuitry in the other of the first power domain and the second power domain could include a switch waveform generator to generate switch waveforms based on the converter control signals received from the controller, in which case the inverter could also include a transformer with a first winding in the first power domain and a second winding in the second power domain. One of the first winding and the second winding could then be coupled to the controller, with the other of the first winding and the second winding being coupled to the switch waveform generation circuitry in the other of the first power domain and the second power domain, to enable the converter control signals to be communicated between the controller and the switch waveform generation circuitry in the other of the first power domain and the second power domain.

In an embodiment, the controller is configured to determine operating parameters for the DC to DC converter to provide Maximum Power Point Tracking (MPPT) for a PhotoVoltaic (PV) power source coupled to the input portion of the DC to DC converter.

Switch waveform generation circuitry could be provided, in the one of the first power domain and the second power domain and operatively coupled to the controller, to generate switch waveforms to open and close one or more switches in the input portion of the DC to DC converter based on the operating parameters determined for the DC to DC converter by the controller. The switch waveform generation circuitry could then be integrated with the controller as a single integrated circuit.

The inverter could also include components in a third power domain sharing no common return path connection with the first power domain or the second power domain. These components could include one or more sensors to sense operating characteristics at an output of the DC to AC converter, for example.

According to another aspect, a DC to AC inverter includes: respective sets of one or more controllable converter switches on opposite sides of an isolation interface with no common return path connection between the sides; a controller, located on one side of the isolation interface, to determine operating parameters for the controllable converter switches in both sets; a switch waveform generator to generate switch waveforms, based on the operating parameters determined by the controller, for opening and closing the controllable converter switches in the set of one or more switches on the other side of the isolation interface; a communication transformer having respective windings on both sides of the isolation interface; and respective communication circuitry on both sides of the isolation interface to enable the controller to communicate with the switch waveform generator through the communication transformer. The communication circuitry on the one side of the isolation interface is coupled to the communication transformer winding on the one side of the isolation interface and implemented in a first integrated circuit, and the communication circuitry on the other side of the isolation interface is coupled to the communication transformer winding on the other side of the isolation interface and implemented in a second integrated circuit.

In an embodiment, the switch waveform generator is located on the one side of the isolation interface and integrated with the communication circuitry on the one side of the isolation interface and the controller in the first integrated circuit.

The switch waveform generator, in another embodiment, is located on the other side of the isolation interface and integrated with the communication circuitry on the other side of the isolation interface in the second integrated circuit.

The communication transformer could be, for example, a transformer implemented in wiring levels of a PCB that carries one or both of the first integrated circuit and the second integrated circuit.

A method of operating a two-stage DC to AC inverter comprising: a first stage comprising a DC to DC converter, the DC to DC converter comprising an input portion in a first power domain and an output portion in a second power domain, the first power domain and the second power domain sharing no common return path connection; and a second stage comprising a DC to AC converter in the second power domain and operatively coupled to the output portion of the DC to DC converter, is also provided. The method involves: determining, by a controller in one of the first power domain and the second power domain, operating parameters for the DC to DC converter and the DC to AC converter; and communicating converter control signals from the controller to the other of the first power domain and the second power domain.

The method could also include generating, in the other of the first power domain and the second power domain, switch waveforms to open and close one or more converter switches in the other of the first power domain and the second power domain.

In an embodiment, the method also includes communicating operating characteristic measurements to the controller from the other of the first power domain and the second power domain.

DETAILED DESCRIPTION

Figure 1:
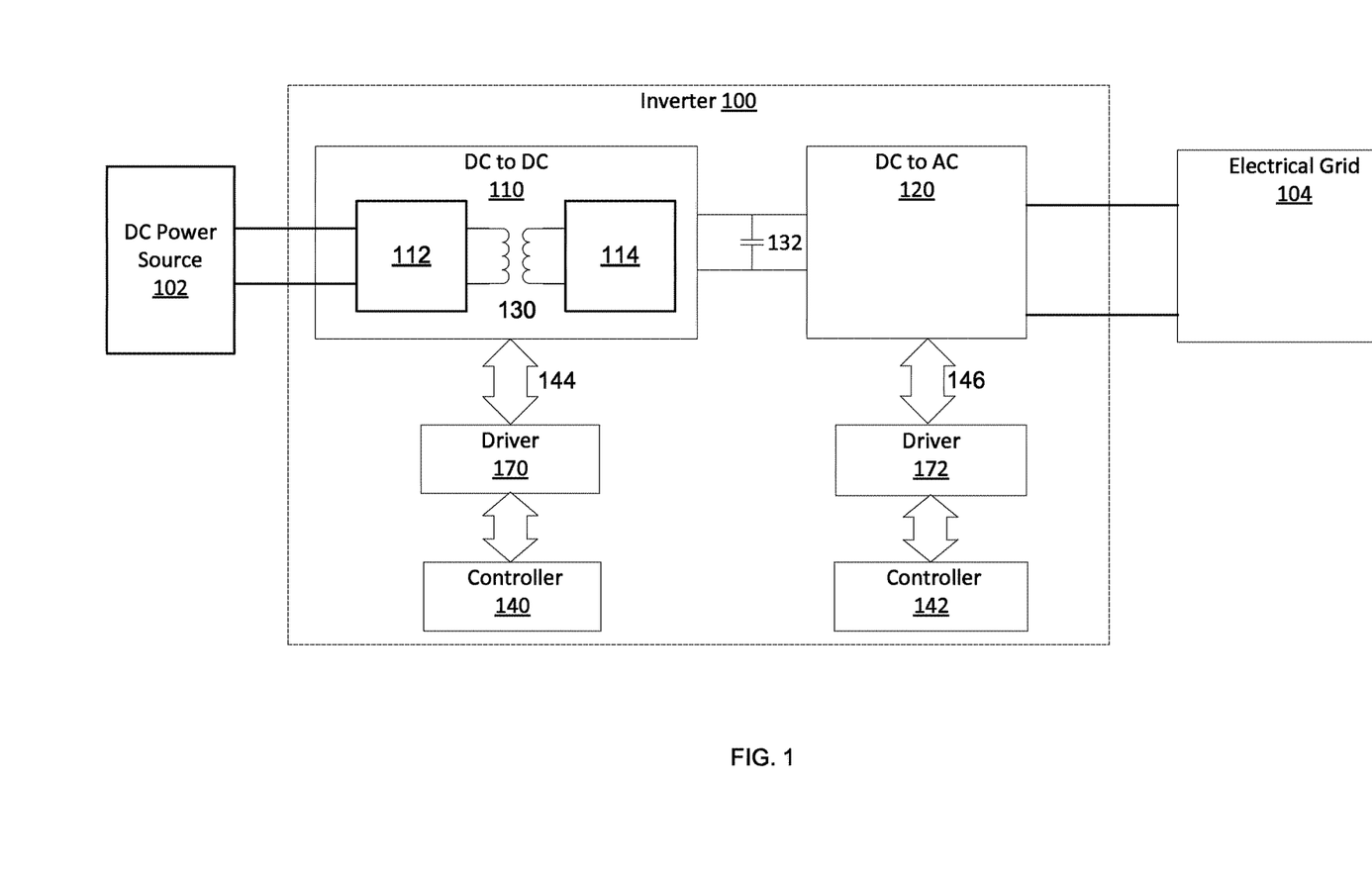
FIG. 1 is a block diagram of an example two stage inverter.

FIG. 1 is a block diagram of an example two stage inverter. Inverter 100 comprises DC to DC converter 110, DC to AC converter 120, controllers 140, 142 and drivers 170, 172. DC to DC converter 110 converts the variable DC voltage of the DC power source 102 to a constant DC voltage. DC to AC converter 120 converts the constant DC voltage to a constant AC voltage compatible with the voltage of electrical grid 104. Electrical grid 104 could be an internal household grid for a residence or business, a microgrid for an institution such as a hospital, university campus or factory complex or an electrical utility grid, for example. Electrical grid 104 could be single phase or multi-phase. Although not shown in FIG. 1 there could also be various disconnect means and/or power conditioning apparatus such as breakers, switches, fuses or transformers between the output of the inverter 100 and electrical grid 104.

DC to DC converter 110 is coupled to DC to AC converter 120, in the example shown, by DC link capacitance 132, which provides energy storage and filtering.

DC power source 102 could be an unregulated power source such as a single photovoltaic panel, an array of photovoltaic panels, a wind turbine or another energy source.

In one embodiment converters 110 and 120 are Switching Mode Power Supplies (SMPSs). The output of an SMPS is regulated by an internal switch or switches operated either in a fully conducting "ON" state or a non-conducting "OFF" state. The proportion of a switch's ON time to its switching period is referred to as its duty cycle. For example, a switch that is ON for 50% of the switching period has a duty cycle of 50%. The output of an SMPS can be controlled by controlling the opening and closing of its switch or switches. Switches may be implemented in a variety of technologies including power Metal Oxide Semiconductor Field Effect Transistors (MOSFETs).

The opening and closing of the switch or switches (referred to hereafter as "switch timing") in DC to DC converter 110 are controlled to output a DC voltage of fixed magnitude to DC link capacitance 132 and DC to AC converter 120. In photovoltaic applications where DC power source 102 is a photovoltaic panel or collection of panels the switch timing may also be controlled to operate the panel or panels at their Maximum Power Point (MPP). The panel array MPP is the combination of its output voltage and current corresponding to maximum output power. Switch timing can also be controlled to reduce voltage stress on the switches and increase the conversion efficiency of DC to DC converter 110. This is often referred to as soft switching, zero voltage switching or zero current switching.

The switch timing of the switches in DC to AC converter 120 are controlled to output AC current with an AC voltage of the same magnitude and frequency as the grid voltage. Switch timing of the switches in DC to AC converter 120 can also be controlled to reduce voltage stress on the switches and increase its conversion efficiency.

The switch timing of the switch or switches in converters 110 and 120 are controlled by controllers 140 and 142 respectively, through switch control signals. Switch control signals are digital signals with voltage levels that are either "High" or "Low". Conventionally, a "High" switch signal closes the switch and a "Low" signal opens the switch.

Controllers 140 and 142 may be implemented as single integrated circuits (ICs) or as a collection of integrated circuits in a low voltage, low power IC process that is incompatible with the higher voltages of converters 110 and 120. The circuitry of controllers 140 and 142 may also lack the required power to directly drive the large load of an SMPS's switches. Switch drivers 170 and 172 may therefore be used to drive the switches.

Switch drivers 170 and 172 receive switch timing signals from controllers 140, 142 and generate switch drive signals of the appropriate voltage and current sourcing capability. Switch drivers 170 and 172 could be implemented in a high voltage, high power IC process. Switch drivers 170 and 172 could also contain analog to digital (A/D) converters (not shown) to digitize voltage and current measurements from converters 110 and 120, respectively and pass these digitized measurements to controllers 140 and 142. Analog to digital conversion might also or instead be done by separate, discrete A/D converters. Analog to digital conversion could also or instead be done by controllers 140, 142.

In some embodiments controllers 140, 142 are general purpose micro-controllers and contain memory for the storage of data and control firmware or software and processors for computation. In another embodiment controllers 140, 142 are custom designed controllers.

Controllers 140 and 142 could also perform other control functions beyond switch timing. These might include any one or more of: anti-islanding, reactive power generation, arc fault detection, data logging or ground fault detection.

The use of two separate controllers 140, 142 as shown in FIG. 1 increases the cost and complexity of an inverter. In many embodiments however, separate controllers are a straightforward solution to control the inverter's operation. For example, in some embodiments an inverter consists of at least two separate and galvanically isolated portions (referred to hereafter as power domains) which do not share a common ground point. In this situation separate controllers for each power domain is a straightforward solution to control the inverter. In other embodiments an inverter consists of two separate portions (also referred to hereafter as power domains) which do not share a common electrical return path but do share a common ground. In this situation separate controllers for each power domain is also a straightforward control solution since ground connections are not intended to be used as signal paths.

Figure 2A:
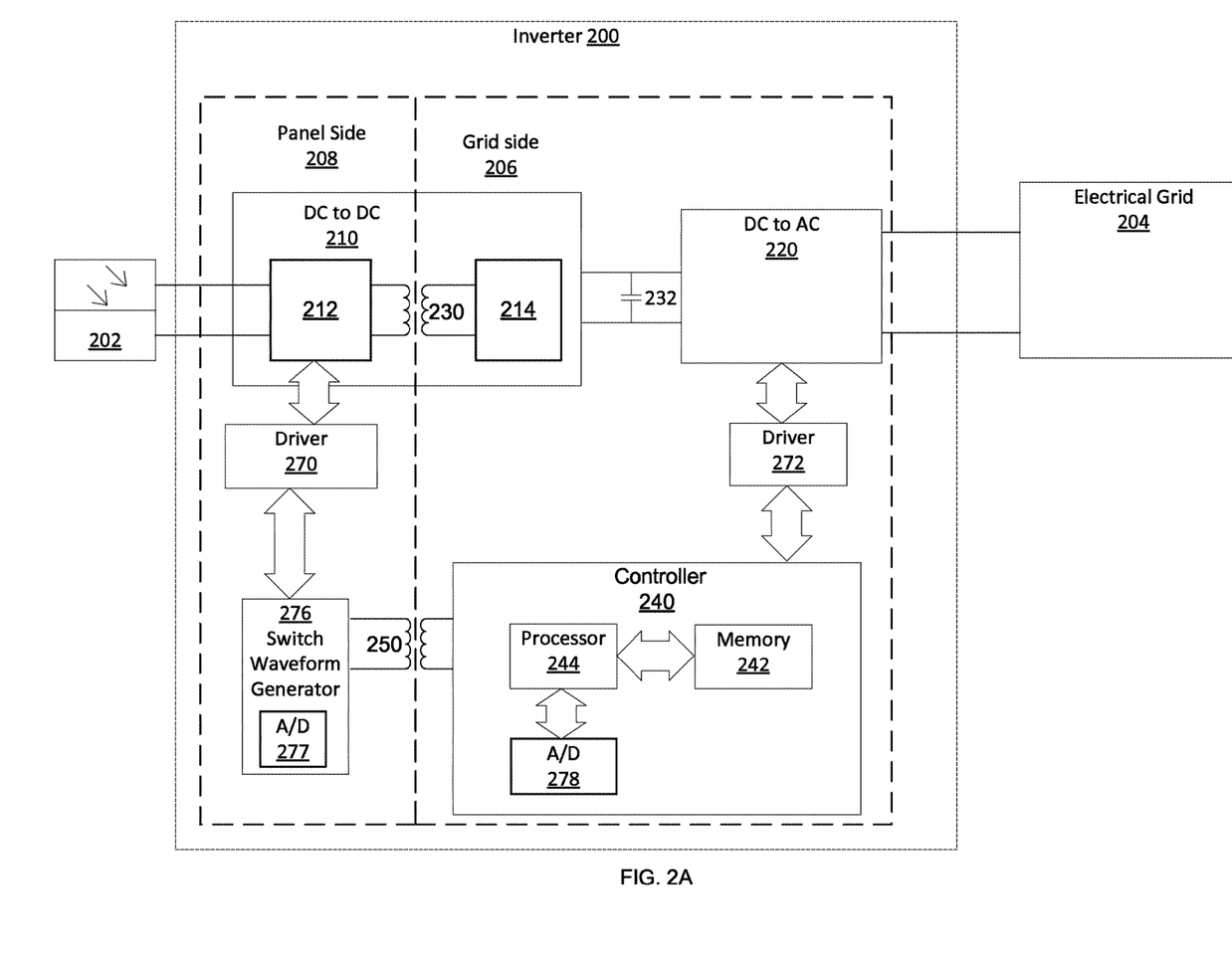
FIG. 2A is a block diagram of another example inverter connected to a photovoltaic panel array.

FIG. 2A is a block diagram of another example inverter connected to a photovoltaic (PV) panel array.

Inverter 200 comprises DC to DC converter 210, DC to AC converter 220, controller 240, switch drivers 270 and 272 and switch waveform generator 276. Inverter 200 receives DC power from PV panel array 202 and outputs power to electrical grid 204. PV panel array 202 might be a string of panels connected in series, multiple panel strings connected in parallel or a single PV panel. DC to DC converter 210 includes an input portion 212 and an output portion 214 which are coupled together through transformer 230. DC link capacitance 232 couples DC to DC converter 210 to DC to AC converter 220 in the example shown, and provides energy storage and filtering.

Controller 240 controls the operation of converters 210 and 220. In one embodiment controller 240 is implemented as a single Integrated Circuit (IC). A single IC implementation of controller 240 could be beneficial in reducing the component count, cost and size of inverter 100. Although controller 240 could in some embodiments include multiple physical components, it should be noted that there is only one, single, common controller for both converters 210, 220 in the example inverter 200. Even if controller 240 has more than one component, those components are used in implementing only one controller to control switching in both converters 210, 220. References herein to a single controller should be interpreted accordingly.

In the example inverter 200, switch control signals are not sent directly to switch driver 270 from controller 240. Controller 240 sends a converter control signal to switch waveform generator 276. The converter control signal could be indicative of any one or more of: a requested output power level, output current level, input voltage level, and input current level of converter 210. The converter control signal could also or instead comprise switch timing parameters for the internal switch(es) of converter input portion 212, such as any one or more of: a duty cycle, a switch ON time, a switch OFF time, a delay in the opening or closing of a switch, an operating mode such as switching at an output voltage minimum or an output voltage maximum. The converter control signal could cause adjustment of the input impedance of input portion 212 to control its input voltage and/or current as part of a Maximum Power Point Tracking (MPPT) algorithm.

Switch waveform generator 276 generates switch waveforms with the appropriate switch timing for input portion 212 from the converter control signal and inputs them to driver 270. Driver 270 receives the switch waveforms and generates augmented switch waveforms with the appropriate voltage and current drive to control the opening and closing of the switch or switches of input portion 212. Switch waveform generator 276 could also receive voltage signals from input portion 212 through driver 270 and digitize them using Analog to Digital converter 277. In one embodiment driver 270 scales the voltage signals to make them compatible with the allowed input voltage range of switch waveform generator 276. The digitized measurement data is communicated to controller 240. This measurement data might be, for example, the output voltage or current of PV panel 202.

In one embodiment controller 240 is a general purpose micro-controller and contains memory 242 for the storage of data and control firmware or software, and a processor 244 for computation. In another embodiment controller 240 is a custom designed Application Specific Integrated Circuit (ASIC). Memory 242 could include one or more solid-state memory devices, although other types of memory devices could also or instead be used.

Controller 240 controls the operation of converters 210 and 220 and therefore issues converter control signals for both of them. Controller 240 also receives measurements from converters 210 and 220 to correctly control their operation. For example, controller 240 could receive measurements from DC to DC converter 210 and issue converter control signals for it such that PV panel 202 operates at its MPP to provide maximum power output. Controller 240 might also receive regular measurements of the input voltage and current of input portion 212 to control the switch timing and output of DC to AC converter 220. These measurements are indicative of how much power PV panel array 202 is supplying to DC to DC converter 210. This power will be transferred to DC to AC converter 220, and it can be easier to control the DC to AC converter if the amount of PV panel power is known. Controller 240 might also receive measurements of the frequency of grid 204 to ensure the output of DC to AC converter 220 matches it.

Input portion 212 of DC to DC converter 210 is electrically isolated from output portion 214 by transformer 230. No physical connection exists between 212 and 214. Thus, if a voltage or signal from one power domain, illustratively the panel side power domain in FIG. 2A, were applied to a load in the other power domain, the grid side power domain in this example, no direct current would flow since there is no return path to carry the current back to the originating power domain.

Figure 2B:
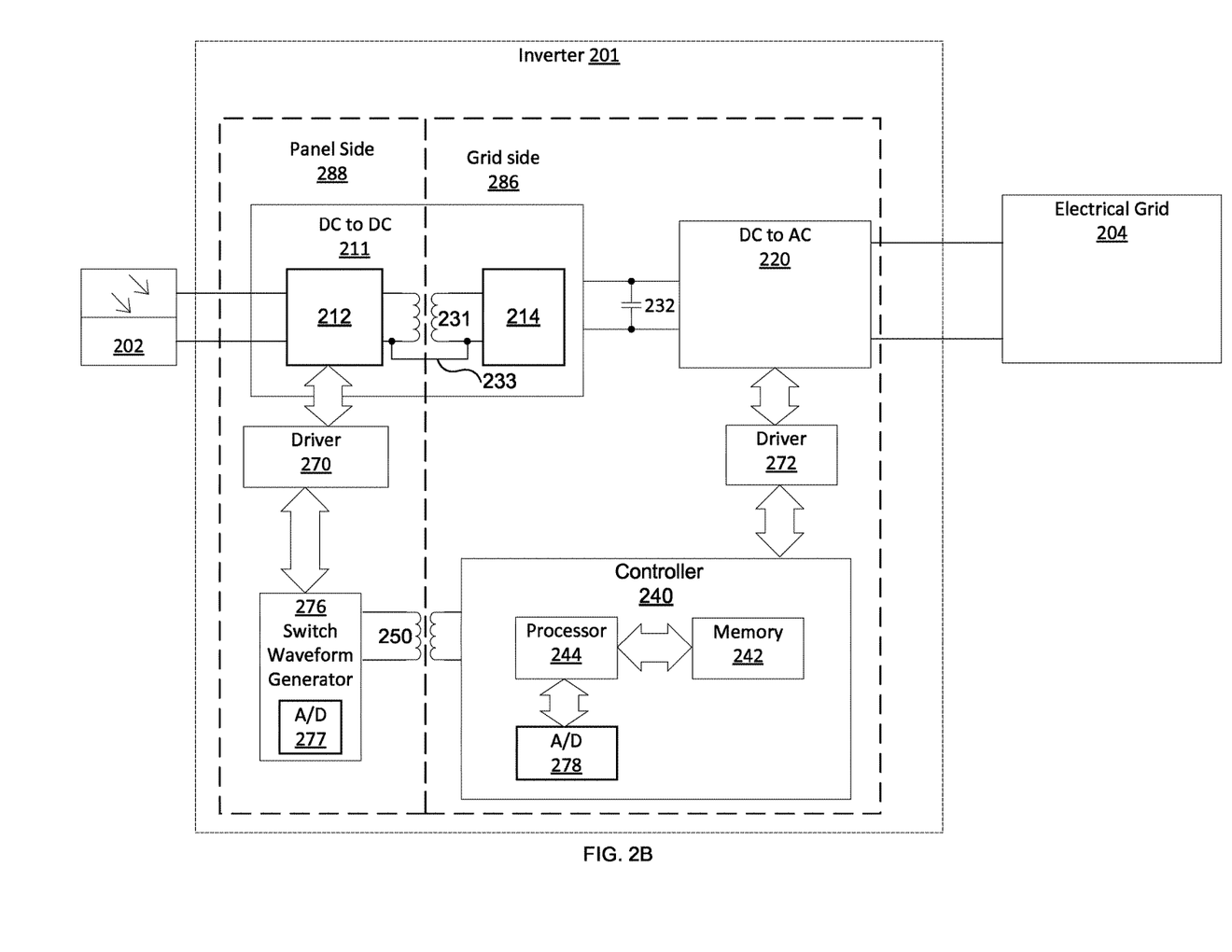
FIG. 2B is a block diagram of a further example inverter connected to a photovoltaic panel array.

FIG. 2B is a block diagram of a further example inverter 201 which includes many components similar to inverter 200 of FIG. 2A but which comprises a single power domain. Connection 233 in non-isolating transformer 231, which is part of DC to DC converter 211 in the example shown, connects the panel side 288 and the grid side 286. If a signal is applied from panel side 288 to grid side 286, then connection 233 provides a common return path connection from grid side 286 back to panel side 288.

It should be noted that 286, 288 are not separate power domains in FIG. 2B, which is included herein to provide a comparative example of a system that includes a common return path connection and a single power domain, as opposed to a system as in FIG. 2A in which there is no common return path connection between different power domains.

Isolation into separate power domains is a common feature of many inverters and might be required for regulatory reasons or for safety. DC to DC converter topologies that support isolation include, for example, flyback converters. With reference to FIG. 2A, inverter 200 is therefore divided into two separate and isolated power domains which do not share a common ground, or at least do not share a common return path. The "grid side" power domain 206 of inverter 200 comprises output portion 214, DC to AC converter 220 and controller 240. The "panel side" power domain 208 comprises input portion 212 of converter 210. The maximum voltage in the panel side power domain 208 of the inverter 200 will be the open circuit voltage of the PV panel 202 at full insolation. This is normally in the range of 50 volts for a single PV panel but could be hundreds of volts for a string of panels. The maximum voltage in the grid side power domain 208 will be determined by the peak to peak voltage of the electrical grid 204.

Controller 240 is located in one of the two power domains 206, 208 and electrically isolated from the other domain. In the example inverter 200, controller 240 is located in the grid side domain 206 and is electrically isolated from the panel side domain 208. A communication means is therefore provided for controller 240 to communicate across the electrical isolation between the power domains 206, 208, to issue converter control signals and possibly receive measurements.

It could be advantageous to locate controller 240 on the grid side power domain 206, since the bandwidth requirements to control and communicate with DC to AC converter 220 might be larger than the bandwidth requirements to communicate with and control input portion 212 of DC to DC converter 210. Location of controller 240 on the grid side power domain 206 of the example inverter 200 could therefore reduce the bandwidth requirements of the communication interface across the inter-domain isolation.

Alternatively controller 240 could be located on the panel side power domain 208.

Any of a number of options could be used to provide for communication across electrical isolation between the power domains 206, 208. One option is an optocoupler. Optocouplers rely on an optical signal to communicate across the isolation and include a photodiode and a photoreceptor pair. Another option is a digital isolator, which might rely on capacitive coupling, for example. Both of these options add cost and may decrease the reliability of the inverter.

In an embodiment, a transformer is used as the communication means to communicate between the panel side power domain 208 and the grid side power domain 206. Controller 240 is located in the grid side power domain 206 in the example inverter 200, and communicates with the panel side power domain 208 of inverter 200 through transformer 250.

Figure 3:
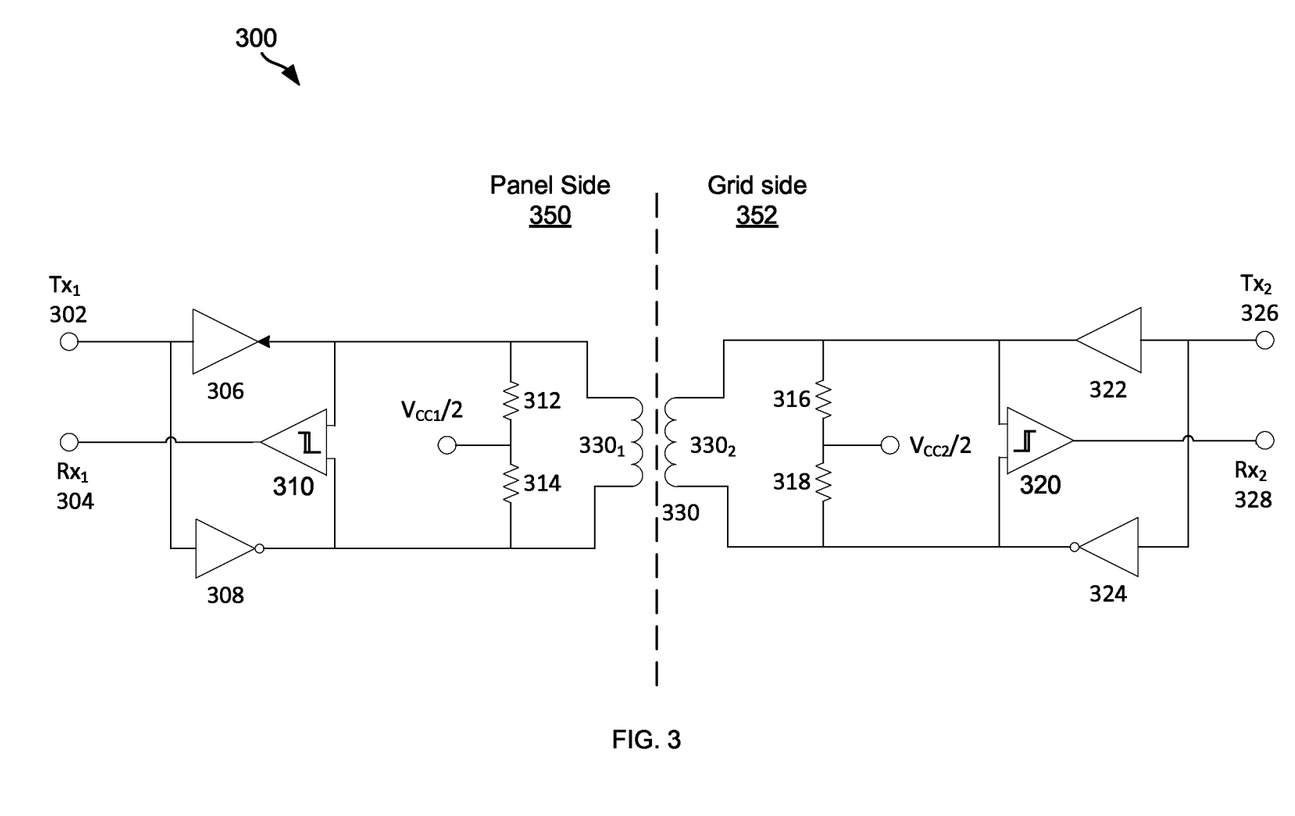
FIG. 3 is schematic diagram of an example analog interface circuit.

FIG. 3 is schematic diagram of an example analog interface circuit 300, which provides for bi-directional digital communication across electrical isolation using a transformer. The example interface circuit 300 comprises first transmit and receive terminals 302 and 304, first buffer pair 306 and 308, first comparator 310, termination resistor pair 312 and 314 coupled to first winding $330_1$ of transformer 330 in the panel side power domain 350, second transmit and receive terminals 326 and 328, second buffer pair 322 and 324, second comparator 320 and second resistor termination pair 316 and 318 coupled to a second winding $330_2$ of transformer 330 in the grid side power domain 352.

In FIG. 3, buffers 308 and 324 are non-inverting buffers while buffers 306 and 322 are inverting buffers. In response to a digital signal on transmit terminal 302 buffer pair 306 and 308 produce a differential voltage across winding $330_1$. This voltage is reflected into second winding $330_2$ and detected by comparator 320 producing a signal at the second receive terminal 328. Transmission in the opposite direction, from second transmit terminal 326 to first receive terminal 304, operates in a similar manner.

Termination resistor pairs 312, 314 and 316, 318 terminate their transformer windings $330_1$ and $330_2$ respectively, and are connected to the midpoint of the digital power supply rails of their power domains $V_{CC1}$ and $V_{CC2}$ respectively. When transmitting, the voltage from the buffers 306, 308 or 322, 324 is divided by the ratio of the buffer output resistance and the termination resistors. This reduced voltage minimizes the current in the small magnetizing inductance of the transformer 330 and provides dynamic range for common mode transient rejection.

In one embodiment the grid side portion of interface circuit 300 in the grid side power domain 352 is integrated with controller 240 (FIG. 2A) as a single IC. The panel side portion 350 could similarly be integrated with other panel side power domain components, and in an embodiment the panel side power domain components of the interface circuit 300 are integrated into switch waveform generator 276 and/or driver 270 (FIG. 2A) as a single IC.

Figure 4:
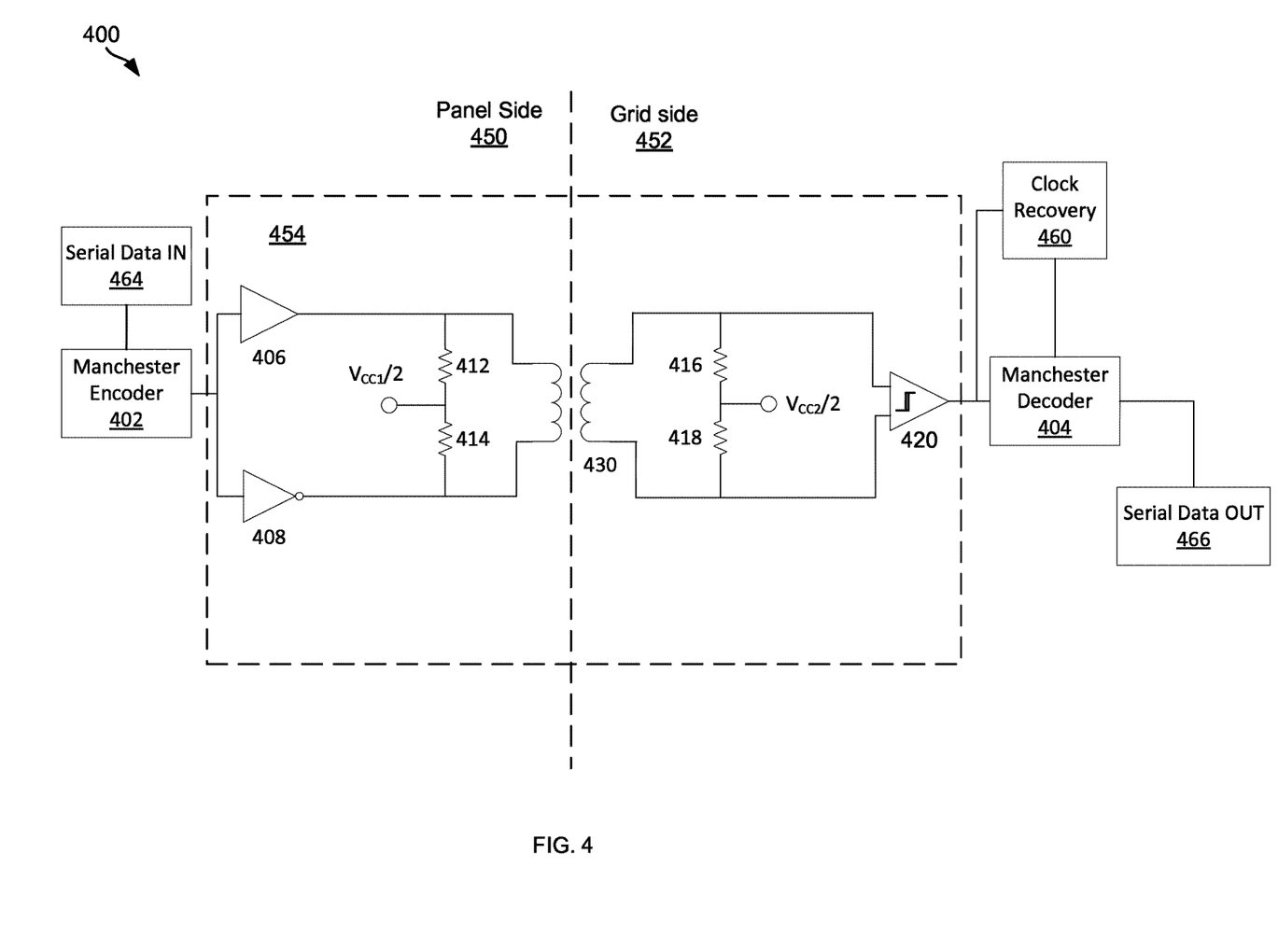
FIG. 4 is a block diagram of an example encoding/decoding circuit using Manchester encoding.

The digital data that is transmitted through the communication transformer 330 is encoded in some embodiments to eliminate the DC component which cannot be transmitted by the transformer. FIG. 4 is a block diagram of an example encoding/decoding circuit using Manchester encoding. Manchester encoding is an encoding scheme that encodes data as a voltage transition rather than as an absolute voltage value. For example a logic 0 is represented by a High-Low signal sequence and a logic 1 is represented by a Low-High signal sequence.

Encoding/decoding circuit 400 comprises encoder 402, decoder 404, clock recovery circuit 460 and interface circuit 300. Encoder 402 accepts a serial input data stream 464 generated on panel side power domain 450 and transforms it into Manchester encoded data. The Manchester encoded data is then transmitted to grid side power domain 452 by interface circuit 454, and is decoded by Manchester decoder 404 from Manchester encoding, to produce serial output data 466. Clock recovery circuit 460 recovers the original clocking of serial data 464. The input and output serial data 464, 466 could, but need not necessarily, have the same clear form. Different coding could be used in the panel side and grid side power domains.

The circuit 400 in FIG. 4 allows data to be transmitted from panel side power domain 450 to grid side power domain 452. A mirrored version of the circuit 400 allows data to be transmitted from grid side 452 to panel side 450, but has not been shown in FIG. 4 to avoid congestion in the drawing. In the reverse direction, serial input data, such as converter control signals, originate in the grid side power domain 452 and are encoded and delivered to the panel side power domain 450. For bi-directional communications, a Manchester encoder 402, a Manchester decoder 404, and a clock recovery circuit 460 are provided in each of the two power domains 450, 452.

In one embodiment the grid side power domain portion of the encoding/decoding circuit 400 are integrated with controller 240 (FIG. 2A) as a single IC. The panel side power domain portion could similarly be integrated with other panel side domain components, and in an embodiment the panel side power domain components of the encoding/decoding circuit 400 are integrated with switch waveform generator 276 and/or driver 270 (FIG. 2A) as a single IC.

The use of a discrete transformer to communicate across electrical isolation increases the cost, component count and size of an inverter. In one embodiment, a communication transformer such as 250, 330, 430 of FIGS. 2A, 3 and 4 is a planar transformer implemented using the wiring levels of a Printed Circuit Board (PCB) which carries some or all of the remaining components of inverter 200.

A PCB is a substrate that often includes multiple wiring levels separated by non-conductive layers and is used to mechanically support and electrically connect electronic components, such as integrated circuits, passive devices, and/or discrete components, of an electrical device.

By implementing a communication transformer using the wiring levels of a multi-level PCB, an additional discrete transformer is not required. This reduces the cost and component count of the inverter. If the planar transformer is implemented with only some of the PCB's wiring levels, then other electronic components may be placed above or below the planar transformer and connected using the remaining PCB wiring levels which are not used to implement the planar transformer. There is therefore potentially no additional area required for the planar transformer.

The use of a planar transformer can also potentially reduce the overall height of the inverter. Discrete transformers sit on the PCB surface and may increase the overall height of a finished board. A planar transformer that is part of the PCB itself does not increase the height of the finished board.

A planar transformer could also reduce the overall complexity of the inverter manufacturing process. It requires no additional manufacturing step or process since it is fabricated as part of the PCB manufacturing process.

Figure 5A:
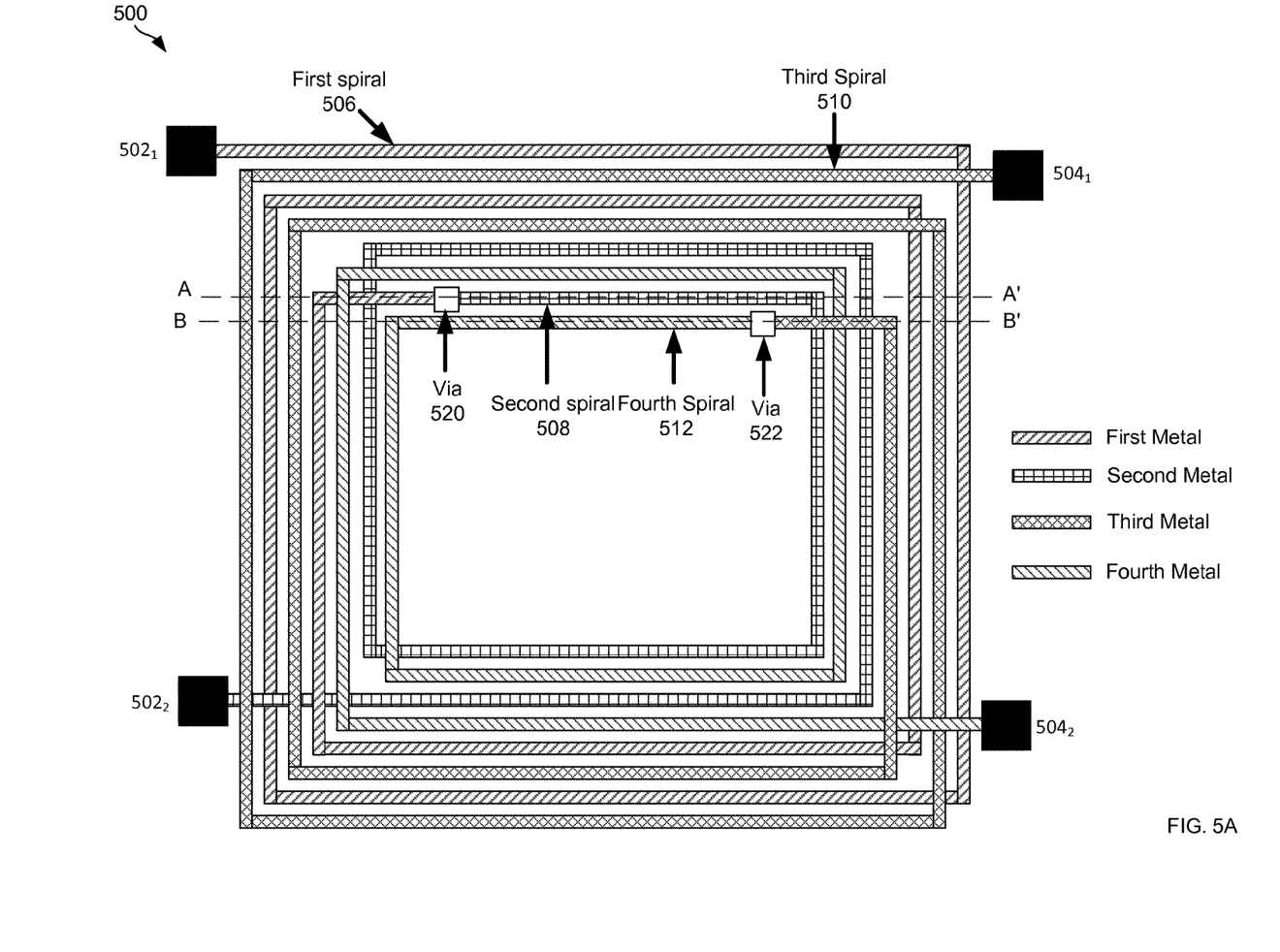
FIG. 5A is an example of a planar transformer implemented in four wiring levels.
Figure 5B:
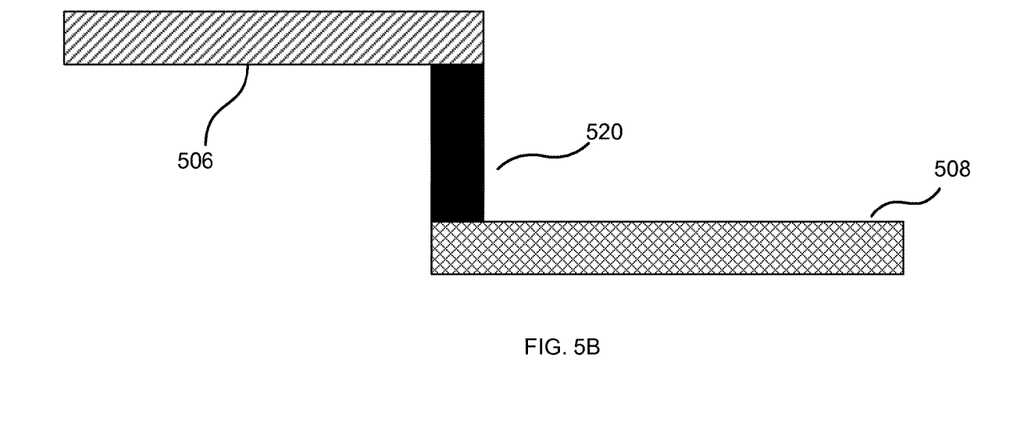
FIG. 5B is a cross-sectional view along line A-A' through via 520 in FIG. 5A.
Figure 5C:
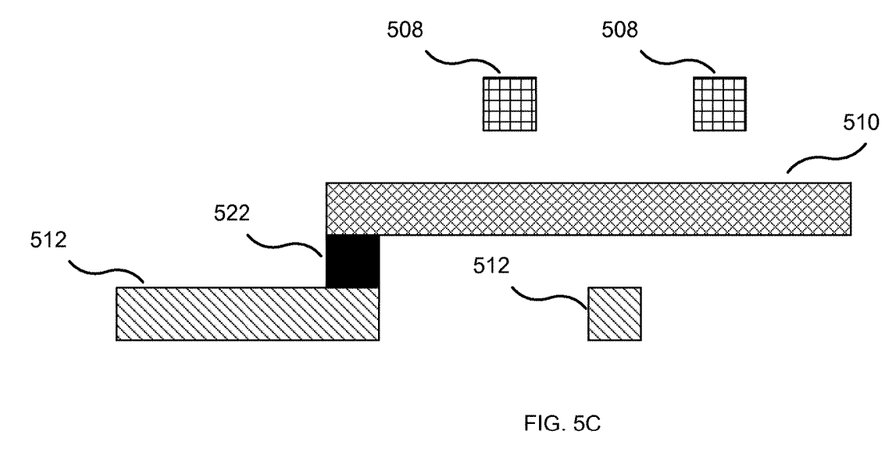
FIG. 5C is a cross-sectional view along line B-B' through via 522 in FIG. 5A.

FIG. 5A is an example of a planar transformer implemented in four wiring levels. The planar transformer 500 includes first terminal pair $502_1$, $502_2$, second terminal pair $504_1$ $504_2$, spirals 506, 508, 510, 512 and vias 520 and 522. FIG. 5B is a cross-sectional view along line A-A' through via 520. FIG. 5C is a cross-sectional view along line B-B' through via 522. In the example shown, transformer 500 comprises a first winding and a second winding. Terminal $502_1$ connects to first spiral 506 to begin the first winding. First spiral 506 connects to second spiral 508 through via 520. Second spiral 508 connects to terminal $502_2$ to complete the first winding. Terminal $504_1$ connects to third spiral 510 to begin the second winding. Third spiral 510 connects to fourth spiral 512 through via 522. Fourth spiral 512 connects to terminal $504_2$ to complete the second winding.

In one embodiment spirals 506 and 508 are fabricated in the first and third metal layers of the PCB and spirals 510 and 512 are fabricated in the second and fourth metal layers of the PCB. In this embodiment the coupling between the windings is maximized.

In one embodiment the spirals have a metal line width of 10 thousandths of an inch, an inductance of 350 nH and a coupling constant of 0.3.

Figure 6:
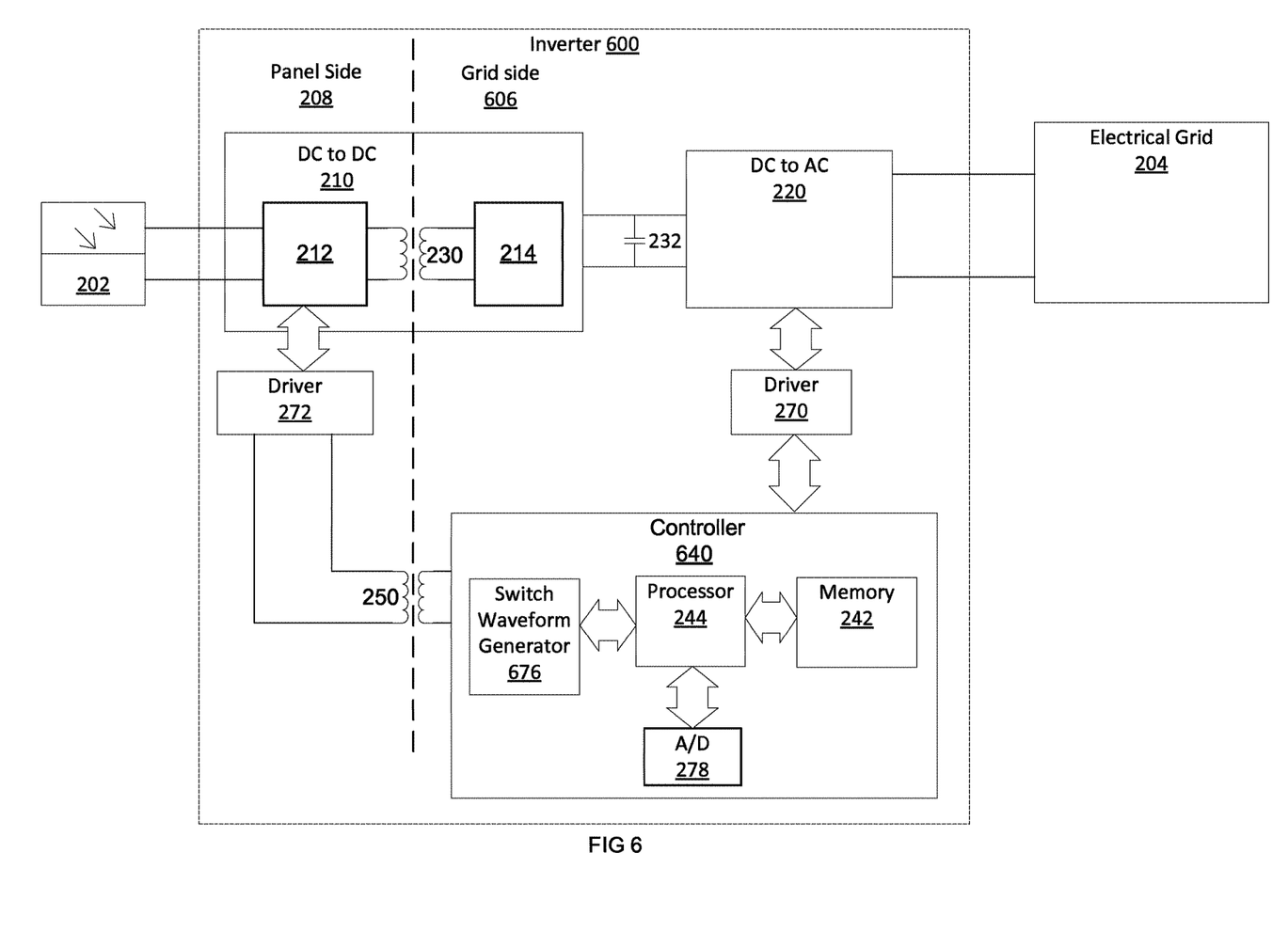
FIG. 6 is a block diagram of another example inverter.

FIG. 6 is a block diagram of another example inverter. In this embodiment, switch waveform generator 676 is part of controller 640 and is located in the grid side power domain 606 of inverter 600. In this embodiment switch control signals are sent directly to switch driver 272 through transformer 250. Other components shown in FIG. 6 could be implemented in the same manner as similarly labelled components in FIG. 2A, described above.

Figure 7:
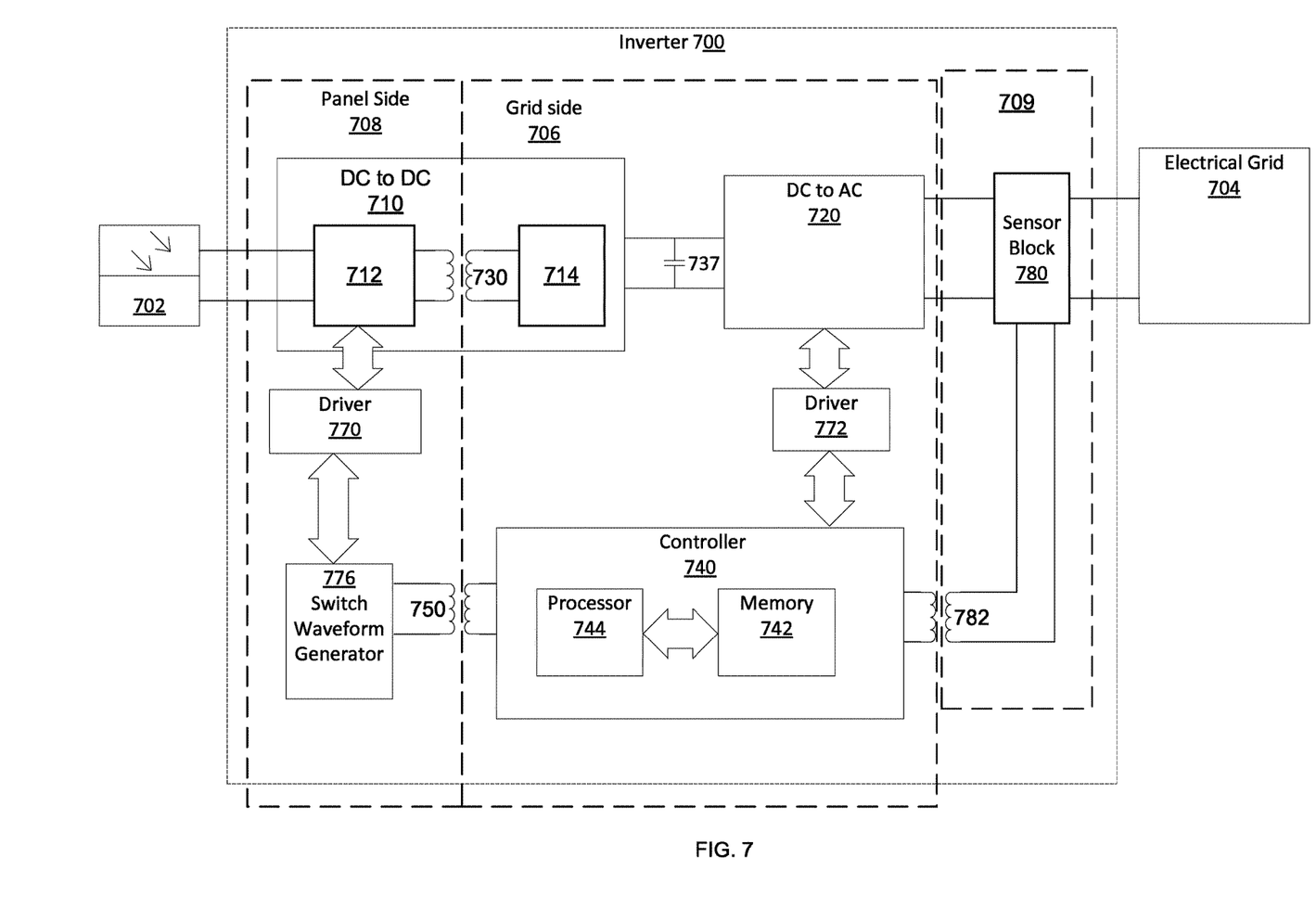
FIG. 7 is a block diagram of an example inverter employing an isolated sensor block.

In some embodiments, there could be other isolated power domains in addition to the grid side power domain and panel side power domain. For example, some sensing circuitry could be provided and isolated from the rest of an inverter. FIG. 7 is a block diagram of an example inverter employing an isolated sensor block.

Inverter 700 includes many components that could be implemented in the same manner as similarly labelled components in FIG. 2A, such as the PV panel array 702, the DC to DC converter 710 with input portion 712, output portion 714 and transformer 730, the DC to AC converter 720, the DC link capacitance 737, the drivers 770, 772, the switch waveform generator 776, the transformer 750, the controller 740 including processor 744 and memory 742, and the electrical grid 704. The inverter 700 also comprises sensor block 780 for sensing operating characteristics of the grid 704. These operating characteristics could include any one or more of: the grid voltage, frequency and the inverter output current. Sensor block 780 is isolated and does not share a common ground or at least does not share a common return path with the rest of the inverter 700. It communicates its measurements to controller 740 through transformer 782. In some embodiments the interface and encoding/decoding circuitry used for controller 740 to communicate with switch waveform generator 776 is also used to communicate with sensor block 780. The panel side power domain of the inverter 700 is shown at 708, the grid side power domain is shown at 706, and a third power domain of the sensor block 780 is shown at 709.

As disclosed herein, a two-stage DC to AC inverter such as 200, 600, 700 could include a first stage and a second stage. In an embodiment, the first stage includes a DC to DC converter such as 210, 710, which has an input portion 212, 712 in a first power domain 208, 708 and an output portion 214, 714 in a second power domain 206, 606, 706. The first power domain 208, 708 and the second power domain 206, 706 could be galvanically isolated, but at least share no common return path connection. The second stage could include a DC to AC converter such as 220, 720 that is in the second power domain 206, 706 and is operatively coupled to the output portion 214, 714 of the DC to DC converter 210, 710.

A single controller 240, 640, 740 is located in one of the power domains. In the examples shown in FIGS. 2A, 6, and 7, the controller 240, 640, 740 is located in the grid side power domain 206, 606, 706, but is operatively coupled to the DC to DC converter 210, 710 and to the DC to AC converter 220, 720. The controller 240, 640, 740 determines operating parameters for the DC to DC converter 210, 710 and the DC to AC converter 220, 720. Even though the controller 240, 640, 740 is in the grid side power domain 206, 606, 706 in the examples shown, it provides overall switching control for converter switches in both the panel side power domain 208, 708 and the grid side power domain. A second controller is not used in the panel side power domain 208, 708.

Examples of operating parameters that could be determined by the controller 240 for the converters or converter switches include any one or more of: a requested output power level, output current level, input voltage level, and input current level of converter 210. The operating parameters could also or instead include switch timing parameters for the internal switch(es) of converter input portion 212, such as any one or more of: a duty cycle, a switch ON time, a switch OFF time, a delay in the opening or closing of a switch, an operating mode such as switching at an output voltage minimum or an output voltage maximum. Input impedance, input voltage, and/or input current of input portion could be determined as operating parameters as part of an MPPT algorithm. Any of various power, voltage, current, and/or switch timing parameters could similarly be determined for the DC to AC converter 220 by the controller 240.

Converter control signals output by the controller 240 based on the determined operating parameters could include the actual determined operating parameters or other information that is based on the determined operating parameters. For example, the controller 240 could determine a target converter output power level and provide, in a converter control signal, switch timing parameters to achieve the target output power level.

Communication between different power domains is provided through a transformer 250, 750 in the examples shown. The transformer 250, 750 has a first winding in one power domain and a second winding in the other power domain. One winding is coupled to the controller 240, 640, 740 to enable communications between the controller and a component, in the other power domain, that is coupled to the other winding of the transformer 250, 750.

The transformer 250, 750 could be implemented as a planar transformer, in wiring levels of a PCB that carries components of one or more of the DC to DC converter 210, 710, the DC to AC converter 220, 720, and the controller 240, 640, 740.

Communication circuitry in the same power domain as the controller 240, 640, 740 could be used to enable the controller to communicate with a component in the other power domain. The communication circuitry could be integrated with the controller 240, 640, 740 as a single integrated circuit. Examples of such communication circuitry are shown in FIGS. 3 and 4.

Other components could also or instead be integrated together in integrated circuits. For example, communication circuitry could also be provided in the other power domain which does not include the controller 240, 640, 740, to enable a component in the other power domain to communicate with the controller. Switch waveform generation circuitry, such as the switch waveform generator 276, 776, could also be provided in the other power domain and operatively coupled to the communication circuitry, to generate switch waveforms to open and close one or more switches in the input portion of the DC to DC converter 210, 710 based on the operating parameters determined for the DC to DC converter by the controller 240, 640, 740. The communication circuitry could be integrated with switch waveform generation circuitry as a single integrated circuit in the panel side power domain 208, 708 in this example.

Respective switch waveform generation circuitry could be provided in the first power domain and the second power domain, to receive converter control signals from the controller 240, 640, 740 and to generate respective switch waveforms to open and close one or more switches in the input portion 212, 712 of the DC to DC converter 210, 710 and one or more switches in the DC to AC converter 220, 720 based on the converter control signals. Although the examples in FIGS. 2A and 7 show only one switch waveform generator 276, 776 for the converter switches in the panel side power domain 208, 708, switch waveform generation circuitry could also be provided in the grid side power domain 206, 706 for the converter switches in that power domain.

Thus, the single controller 240, 640, 740 could, but need not necessarily actually open and close the converter switches. For instance, converter control signals could be provided to switch waveform generation circuitry, which in turn generates switch waveforms to actually open and close the converter switches. Even this path from switch waveform circuitry to the converter switches need not be direct. As shown in FIGS. 2A and 7, for example, the switch waveform generators 276, 776 provide switch waveforms to drivers 270, 770, which in turn drive the converter switches. The controller 240, 640, 740 itself could provide a switch waveform generation function for at least the switches in its own power domain, as in FIGS. 2A and 7, for example. Although the controller 240, 640, 740 provide for ultimate control of switching by determining switch timing, other components could be involved in actually opening and closing converter switches according to the determined operating parameters.

Embodiments are in no way limited to only two power domains. As shown in FIG. 7, for instance, an inverter 700 could include components in a third power domain 709 sharing no common return path connection with the first power domain 708 or the second power domain 706. The components in the third power domain include one or more sensors to sense operating characteristics at an output of the DC to AC converter 220, 720 in the example shown.

Considering a DC to AC inverter more generally, respective sets of one or more controllable converter switches could be provided on opposite sides of an isolation interface with no common return path connection between the sides, with a controller 240, 740, located on one side of the isolation interface, to determine operating parameters for the controllable converter switches in both sets. In an embodiment, a switch waveform generator 276, 776 is provided to generate switch waveforms, based on the operating parameters determined by the controller 240, 740, for opening and closing the controllable converter switches in the set of one or more switches on the other side of the isolation interface, and a communication transformer 250, 750 has respective windings on both sides of the isolation interface. Respective communication circuitry on both sides of the isolation interface enable the controller 240, 740 to communicate with the switch waveform generator 276, 776 through the communication transformer 250, 750.

The communication circuitry on the one side of the isolation interface is coupled to the communication transformer winding on the one side of the isolation interface and implemented in a first integrated circuit, and the communication circuitry on the other side of the isolation interface is coupled to the communication transformer winding on the other side of the isolation interface and implemented in a second integrated circuit. On the controller side of the isolation interface, the communication circuitry could be integrated with the controller 240, 740 in the first integrated circuit. The communication transformer could be implemented in wiring levels of a PCB that carries one or both of the first integrated circuit and the second integrated circuit.

The switch waveform generator could be located on either side of the isolation interface and integrated with other components on the side of the isolation interface on which it is located. For instance, the switch waveform generator could be located on the same side of the isolation interface as the controller and be integrated with the controller and the communication circuitry on that side of the isolation interface in the first integrated circuit. If located on the other side of the isolation interface, the switch waveform generator could be integrated with the communication circuitry on the other side of the isolation interface in the second integrated circuit.

Figure 8:
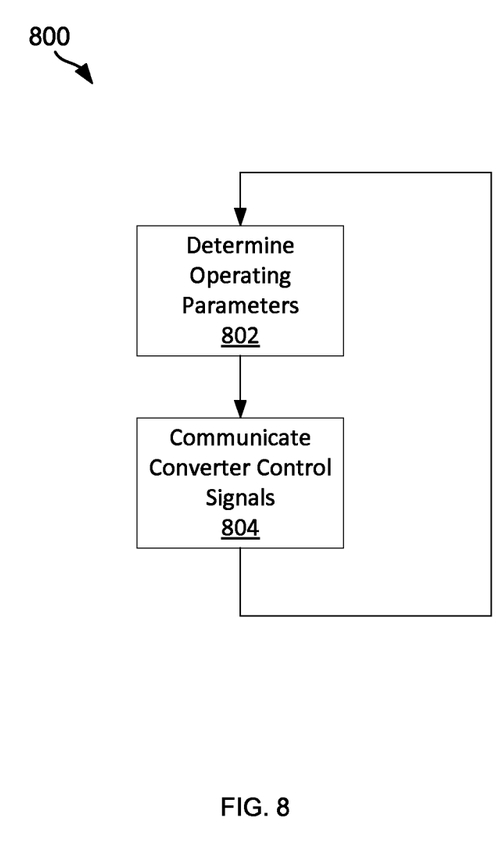
FIG. 8 is a block diagram of an example method.

Embodiments are described above primarily in the context of apparatus or systems. Other embodiments are also contemplated. For instance, another embodiment provides a method of operating a two-stage DC to AC inverter. FIG. 8 shows an example of such a method. The example method 800 involves determining 802, by a controller 240, 640, 740 in one of power domains 208/708, 206/606/706, operating parameters for the DC to DC converter and the DC to AC converter, and communicating 804 converter control signals from the controller to the other power domain.

Opening and closing of converter switches could also entail generating, in the other power domain, switch waveforms to open and close one or more converter switches in the other power domain.

An additional features that could be provided in some embodiments relates to communicating operating characteristic measurements to the controller 240, 640, 740 from the other power domain. Converter control signals could then be provided by the controller from its power domain into another power domain, and measured operating characteristics, such as one or more of voltage, current, and frequency at any of various circuit points, could be provided to the controller for any of various purposes, such as inverter monitoring and/or converter switch control.

What has been described is merely illustrative of the application of principles of embodiments of the present disclosure. Other arrangements and methods can be implemented by those skilled in the art.

For example, the contents of the drawings are intended solely for the purpose of illustration. Other embodiments could include further, fewer, and/or different components interconnected in similar or different circuit topologies. For example, although the DC to AC converter 220, 720 is depicted as a single phase inverter it could also be a multi-phase inverter. Additionally, although DC to DC converter 210, 710 is depicted as having a transformer 230, 730 with a single primary and a single secondary winding, an interleaved DC to DC converter design might be used with multiple parallel transformer windings and associated switches. As discussed above with reference to FIG. 7, there could be additional power domains on the grid side of an inverter. Similarly, there could be additional power domains on the panel side. For example, although DC to DC converter 210, 710 is depicted as having a single panel side power domain 208, 708, comprising input portion 212, 712, switch waveform generator 276, 776, and driver 270, 770, multiple isolated power domains might be used, each comprising an input portion, a switch waveform generator and a driver and each communicating with controller 240, 740 across an isolation interface. A planar transformer might be implemented in the wiring levels of a ceramic circuit board which mechanically supports and electrically connects some or all of the components of inverter 200, 600, 700.

In addition, although described primarily in the context of methods and systems, other implementations are also contemplated, as instructions stored on a non-transitory computer-readable medium, for example.

We claim:

1. A two-stage Direct Current (DC) to Alternating Current (AC) inverter comprising:
a first stage comprising a DC to DC converter, the DC to DC converter comprising an input portion in a first power domain and an output portion in a second power domain, the first power domain and the second power domain sharing no common return path connection;
a second stage comprising a DC to AC converter in the second power domain and operatively coupled to the output portion of the DC to DC converter;
a single controller, located in one of the first power domain and the second power domain, and operatively coupled to the DC to DC converter and to the DC to AC converter, to determine operating parameters for the DC to DC converter and the DC to AC converter.

2. The two-stage DC to AC inverter of claim 1, the single controller being located in the second power domain.

3. The two-stage DC to AC inverter of claim 1, further comprising:
a transformer comprising a first winding in the first power domain and a second winding in the second power domain,
one of the first winding and the second winding being coupled to the controller to enable communications between the controller and a component in the other of the first power domain and the second power domain that is coupled to the other of the first winding and the second winding.

4. The two-stage DC to AC inverter of claim 3, the transformer comprising a planar transformer implemented in wiring levels of a Printed Circuit Board (PCB) that carries components of one or more of the DC to DC converter, the DC to AC converter, and the controller.

5. The two-stage DC to AC inverter of claim 1, further comprising:
communication circuitry, in the one of the first power domain and the second power domain, to enable the controller to communicate with a component in the other of the first power domain and the second power domain,
the communication circuitry being integrated with the controller as a single integrated circuit.

6. The two-stage DC to AC inverter of claim 1, further comprising:
communication circuitry, in the other of the first power domain and the second power domain, to enable a component in the other of the first power domain and the second power domain to communicate with the controller;
switch waveform generation circuitry, in the other of the first power domain and the second power domain and operatively coupled to the communication circuitry, to generate switch waveforms to open and close one or more switches in the input portion of the DC to DC converter based on the operating parameters determined for the DC to DC converter by the controller, the communication circuitry being integrated with switch waveform generation circuitry as a single integrated circuit.

7. The two-stage DC to AC inverter of claim 1, further comprising:
respective switch waveform generation circuitry in the first power domain and the second power domain, to receive converter control signals from the controller and to generate respective switch waveforms to open and close one or more switches in the input portion of the DC to DC converter and one or more switches in the DC to AC converter based on the converter control signals.

8. The two-stage DC to AC inverter of claim 7,
the switch waveform generation circuitry in the other of the first power domain and the second power domain comprising a switch waveform generator to generate switch waveforms based on the converter control signals received from the controller,
the two-stage DC to AC inverter further comprising:
a transformer comprising a first winding in the first power domain and a second winding in the second power domain,
one of the first winding and the second winding being coupled to the controller and the other of the first winding and the second winding being coupled to the switch waveform generation circuitry in the other of the first power domain and the second power domain, to enable the converter control signals to be communicated between the controller and the switch waveform generation circuitry in the other of the first power domain and the second power domain.

9. The two-stage DC to AC inverter of claim 1, the controller being configured to determine operating parameters for the DC to DC converter to provide Maximum Power Point Tracking (MPPT) for a PhotoVoltaic (PV) power source coupled to the input portion of the DC to DC converter.

10. The two-stage DC to AC inverter of claim 1, further comprising:
switch waveform generation circuitry, in the one of the first power domain and the second power domain and operatively coupled to the controller, to generate switch waveforms to open and close one or more switches in the input portion of the DC to DC converter based on the operating parameters determined for the DC to DC converter by the controller.

11. The two-stage DC to AC inverter of claim 1, the switch waveform generation circuitry being integrated with the controller as a single integrated circuit.

12. The two-stage DC to AC inverter of claim 1, further comprising components in a third power domain sharing no common return path connection with the first power domain or the second power domain.

13. The two-stage DC to AC inverter of claim 12, the components comprising one or more sensors to sense operating characteristics at an output of the DC to AC converter.

14. A Direct Current (DC) to Alternating Current (AC) inverter comprising:
respective sets of one or more controllable converter switches on opposite sides of an isolation interface with no common return path connection between the sides;
a controller, located on one side of the isolation interface, to determine operating parameters for the controllable converter switches in both sets;
a switch waveform generator to generate switch waveforms, based on the operating parameters determined by the controller, for opening and closing the controllable converter switches in the set of one or more switches on the other side of the isolation interface;
a communication transformer having respective windings on both sides of the isolation interface;
respective communication circuitry on both sides of the isolation interface to enable the controller to communicate with the switch waveform generator through the communication transformer,
the communication circuitry on the one side of the isolation interface being coupled to the communication transformer winding on the one side of the isolation interface and implemented in a first integrated circuit,
the communication circuitry on the other side of the isolation interface being coupled to the communication transformer winding on the other side of the isolation interface and implemented in a second integrated circuit.

15. The DC to AC inverter of claim 14, the switch waveform generator being located on the one side of the isolation interface and integrated with the communication circuitry on the one side of the isolation interface and the controller in the first integrated circuit.

16. The DC to AC inverter of claim 14, the switch waveform generator being located on the other side of the isolation interface and integrated with the communication circuitry on the other side of the isolation interface in the second integrated circuit.

17. The DC to AC inverter of claim 14, the communication transformer comprising a transformer implemented in wiring levels of a Printed Circuit Board (PCB) that carries one or both of the first integrated circuit and the second integrated circuit.

18. A method of operating a two-stage Direct Current (DC) to Alternating Current (AC) inverter comprising: a first stage comprising a DC to DC converter, the DC to DC converter comprising an input portion in a first power domain and an output portion in a second power domain, the first power domain and the second power domain sharing no common return path connection; and a second stage comprising a DC to AC converter in the second power domain and operatively coupled to the output portion of the DC to DC converter, the method comprising:
determining, by a controller in one of the first power domain and the second power domain, operating parameters for the DC to DC converter and the DC to AC converter;
communicating converter control signals from the controller to the other of the first power domain and the second power domain.

19. The method of claim 18, further comprising:
generating, in the other of the first power domain and the second power domain, switch waveforms to open and close one or more converter switches in the other of the first power domain and the second power domain.

20. The method of claim 18, further comprising:
communicating operating characteristic measurements to the controller from the other of the first power domain and the second power domain.

* * * * *